US012647419B1

(12) United States Patent
Fitzgerald et al.

(10) Patent No.: US 12,647,419 B1
(45) Date of Patent: Jun. 2, 2026

(54) SYSTEMS AND METHODS FOR FACILITATING AUTHENTICATION FOR AN ENTITY SYSTEM TO USE A PARTNER SYSTEM USING POOLED IDENTIFIERS

(71) Applicant: Stripe, LLC, South San Francisco, CA (US)

(72) Inventors: Sean Fitzgerald, Seattle, WA (US); Sophia Sakellariadis, San Francisco, CA (US)

(73) Assignee: Stripe, LLC, South San Francisco, CA (US)

( * ) Notice: Subject to any disclaimer, the term of this patent is extended or adjusted under 35 U.S.C. 154(b) by 0 days.

(21) Appl. No.: 19/391,700

(22) Filed: Nov. 17, 2025

Related U.S. Application Data

(63) Continuation of application No. 17/072,749, filed on Oct. 16, 2020.

(51) Int. Cl.
*H04L 9/40* (2022.01)
*G06F 9/54* (2006.01)

(52) U.S. Cl.
CPC .......... *H04L 63/0884* (2013.01); *G06F 9/547* (2013.01)

(58) Field of Classification Search
None
See application file for complete search history.

(56) References Cited

U.S. PATENT DOCUMENTS

| | | | | |
|---|---|---|---|---|
| 2013/0263239 A1* | 10/2013 | Lim | .................... | H04L 63/0884 726/7 |
| 2014/0074569 A1* | 3/2014 | Francis | ................ | G06Q 20/204 705/14.3 |
| 2016/0019536 A1* | 1/2016 | Ortiz | .................... | G06Q 20/382 705/67 |

* cited by examiner

*Primary Examiner* — William J. Goodchild
(74) *Attorney, Agent, or Firm* — Foley & Lardner LLP

(57) ABSTRACT

Some embodiments involve systems and methods for facilitating authentication for an entity system to use a partner system using pooled identifiers (e.g., without requiring the entity system to first register with the partner system). In some embodiments, based on (i) a request, from a first entity system, indicating a first partner system to process at least a part of an operation and (ii) an indication that the first entity system is not registered for use of the first partner system, a platform system may link a first authentication identifier of the first identifier set with the first entity system. The platform system may process the operation using the first authentication identifier linked by the platform system with the first entity system, and the platform system may use platform authentication data established with the first partner system to authenticate the platform system to the first partner system for performing the operation.

20 Claims, 6 Drawing Sheets

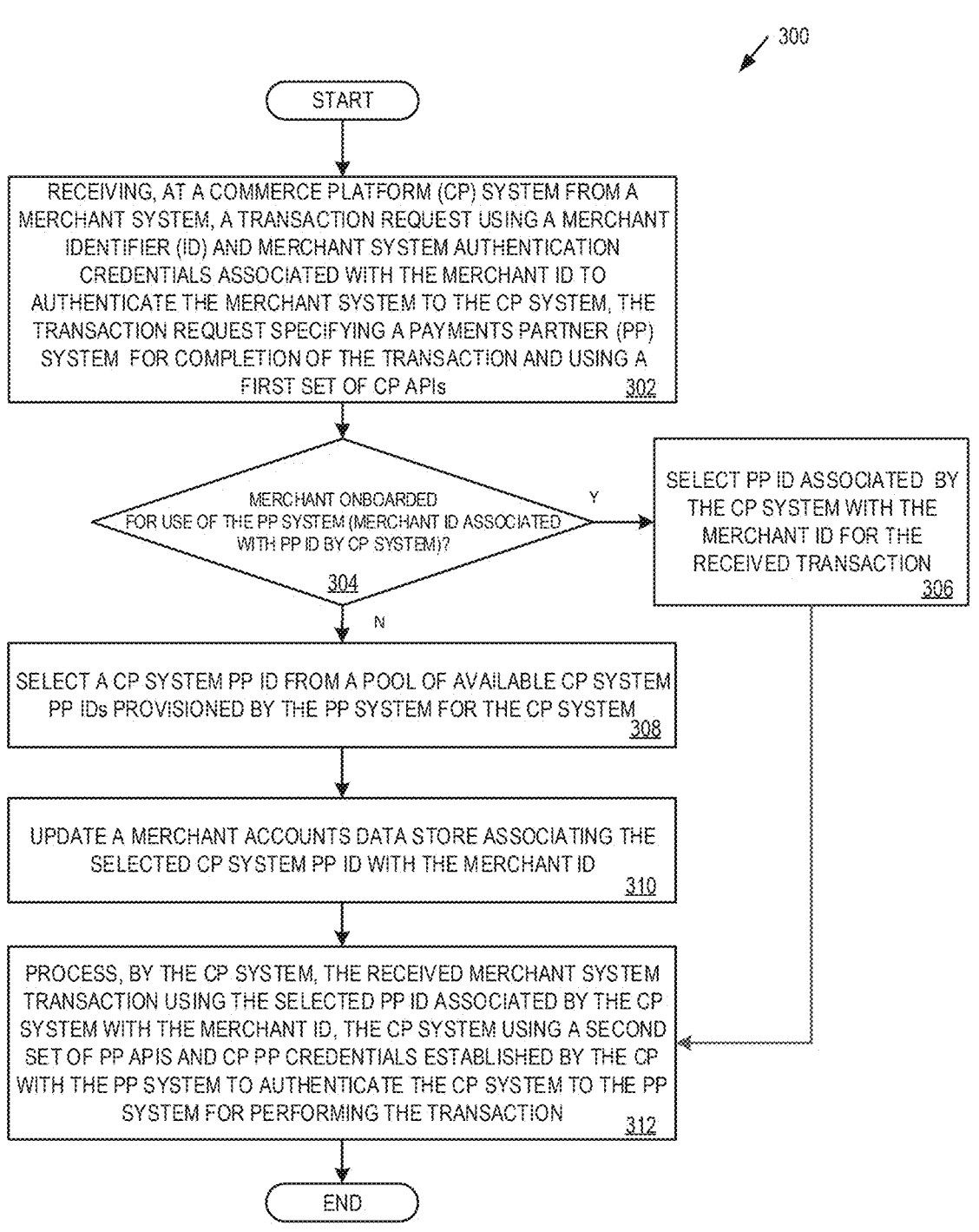

300

START

RECEIVING, AT A COMMERCE PLATFORM (CP) SYSTEM FROM A MERCHANT SYSTEM, A TRANSACTION REQUEST USING A MERCHANT IDENTIFIER (ID) AND MERCHANT SYSTEM AUTHENTICATION CREDENTIALS ASSOCIATED WITH THE MERCHANT ID TO AUTHENTICATE THE MERCHANT SYSTEM TO THE CP SYSTEM, THE TRANSACTION REQUEST SPECIFYING A PAYMENTS PARTNER (PP) SYSTEM FOR COMPLETION OF THE TRANSACTION AND USING A FIRST SET OF CP APIs          302

MERCHANT ONBOARDED FOR USE OF THE PP SYSTEM (MERCHANT ID ASSOCIATED WITH PP ID BY CP SYSTEM)?          304

Y

SELECT PP ID ASSOCIATED BY THE CP SYSTEM WITH THE MERCHANT ID FOR THE RECEIVED TRANSACTION          306

N

SELECT A CP SYSTEM PP ID FROM A POOL OF AVAILABLE CP SYSTEM PP IDs PROVISIONED BY THE PP SYSTEM FOR THE CP SYSTEM          308

UPDATE A MERCHANT ACCOUNTS DATA STORE ASSOCIATING THE SELECTED CP SYSTEM PP ID WITH THE MERCHANT ID          310

PROCESS, BY THE CP SYSTEM, THE RECEIVED MERCHANT SYSTEM TRANSACTION USING THE SELECTED PP ID ASSOCIATED BY THE CP SYSTEM WITH THE MERCHANT ID, THE CP SYSTEM USING A SECOND SET OF PP APIS AND CP PP CREDENTIALS ESTABLISHED BY THE CP WITH THE PP SYSTEM TO AUTHENTICATE THE CP SYSTEM TO THE PP SYSTEM FOR PERFORMING THE TRANSACTION          312

END

FIGURE 3

SYSTEMS AND METHODS FOR FACILITATING AUTHENTICATION FOR AN ENTITY SYSTEM TO USE A PARTNER SYSTEM USING POOLED IDENTIFIERS

SUMMARY

Some embodiments involve systems and methods for facilitating authentication for an entity system to use a partner system using pooled identifiers (e.g., without requiring the entity system to first register with the partner system). In some embodiments, a platform system may store a pool of identifiers comprising (i) an identifier set having identifiers pre-allocated by a first partner system for use by the platform system and (ii) a second identifier set having identifiers pre-allocated by a second partner system for use by the platform system. Based on (i) a request, from a first entity system, indicating the first partner system to process at least a part of an operation and (ii) an indication that the first entity system is not registered for use of the first partner system, the platform system may link a first authentication identifier of the first identifier set with the first entity system. The platform system may process the operation using the first authentication identifier linked by the platform system with the first entity system, and the platform system may use platform authentication data established with the first partner system to authenticate the platform system to the first partner system for performing the operation.

In some embodiments, the registration of the entity system with the first partner system may be performed after completing the operation (e.g., in a process asynchronously with the operation). In this way, for example, there is no latency or delay in the processing of the operation.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 3 is a flow diagram of one embodiment of a method for a platform system real time account onboarding of an entity system to a partner system.

DETAILED DESCRIPTION

Figure 1:
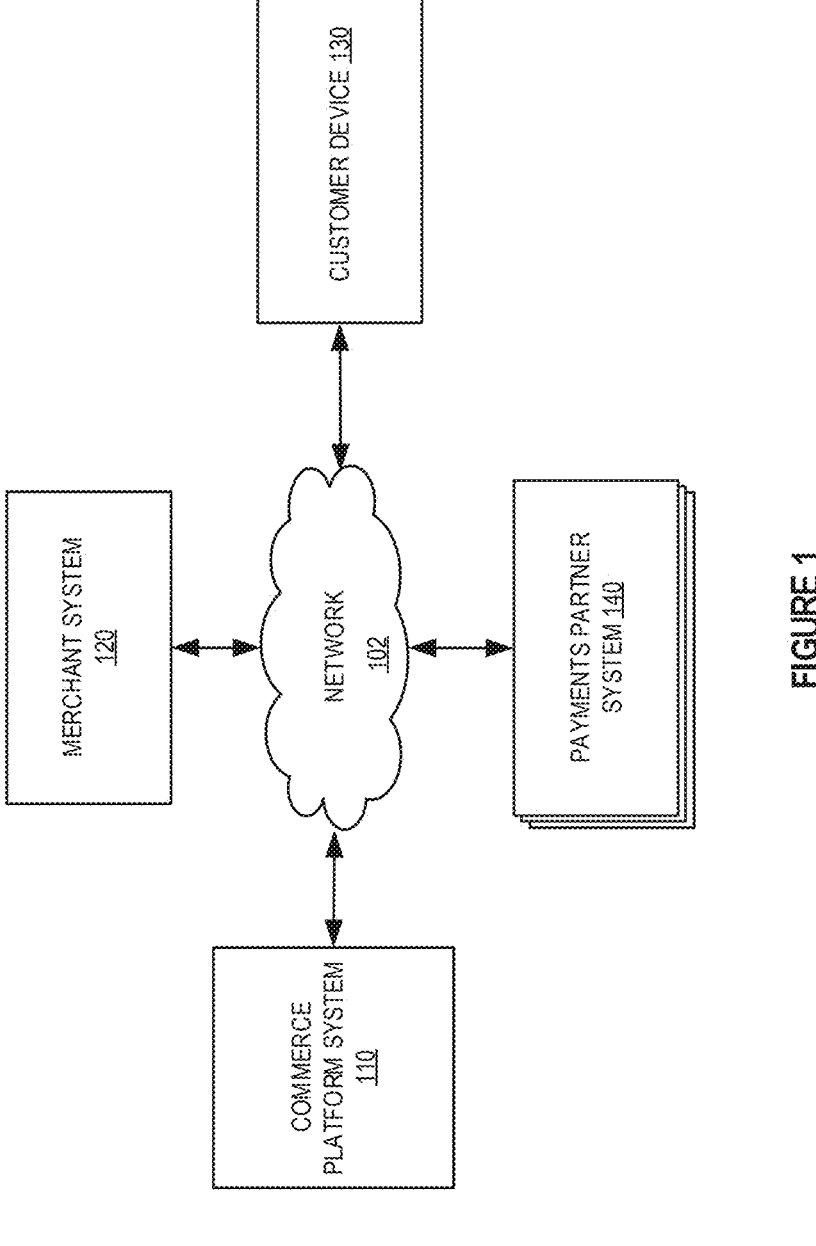
FIG. 1 is a block diagram of an exemplary system architecture for real time account onboarding of an entity system to a partner system by a platform system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "selecting", "updating", "processing", "establishing", "obtaining", "monitoring", "initiating", onboarding", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture for real time account onboarding of an entity system to a partner system by a platform system.

As an example, merchants, such as grocers, car services, dry cleaning services, etc., provide their products and services to consumers. Such merchants often employ agents to deliver their products and/or provide the actual services. For example, a person acting on the merchant's behalf will drive a consumer in their own car, deliver food ordered through a merchant website, pick up and/or drop off clothes dry cleaned by the merchant, etc.

These merchants, although providing a system for supplying products and/or services to consumers through their agents, often do not perform the financial processing associated with the merchant transactions. Instead, merchants utilize commerce systems to process financial transactions for the products and/or services provided to consumers through their agents. This may include the merchant, agent, and other users establishing accounts with the commerce system. Once the accounts are established, merchants can run financial transactions using the services of the commerce system, the agents can accept payments from customers on behalf of the merchant for provided products and/or services, and the commerce system processes the accepted payments, performs payouts for services rendered, as well as other financial processing services. This processing may include running credit cards, crediting a merchant account for the transaction, crediting the agent responsible for the transaction, debiting a commerce system fee for processing the transaction on behalf of the merchant, interacting with authorization network systems (e.g., bank systems, credit card issuing systems, etc.), as well as performing other commerce related transactions for the merchant and/or agent such as providing payouts for products/services rendered on behalf of a merchant. Using the merchant's account information, the commerce platform may further provide account status overviews, enable preferences for accounts, as well as other services that enable a merchant to manage their account with the commerce platform.

In some instances, even though a merchant maintains an account through the commerce platform, the merchant may desire to use the payment processing services of another system. This other system may, for example, enable credit based payments for the customers of the merchant (e.g., the customer may establish a payment plan with the other payments system, such as establishing periodic payment for a purchase while the other payments system provides full remuneration to the merchant), provide an established relationship with a customer of the merchant (e.g., a third party mobile payments and electronic wallet system with which the customer of the merchant has stored financial information and which the customer desires to use when performing online transactions), may provide a payments service for which a customer of the merchant earns incentives (e.g., by using a specific payments system, a customer of the merchant earns "points" or other incentives, and thus the customer desires to use the other payments service), as well as other uses and/or services for which a customer of the merchant may desire to use the other payments service.

When a customer of the merchant, where the merchant has an existing relationship and account with the commerce platform, seeks to use such other payment systems, several technical problems arise. Each account created between the merchant and the other payments service potentially exposes sensitive merchant information, for example due to communication over a communications network, during the account creation process. Furthermore, the merchant system, which may seek to use multiple payments systems to support its customers is required to integrate with each payments system individually, such as establishing accounts at each individual payments system, integrating software applications and systems of the merchant with each different payments system, etc. At best, this creates a technological bottleneck delaying the merchant's use of the other payments systems, and more likely is a barrier to using each of the other payments services that the merchant may desire to use.

In one embodiment, the system 100 includes a commerce platform system 110, a merchant system 120, a customer device 130, and a plurality of payments partner systems, such as payments partner system 140. In one embodiment, customer device 130 may be a mobile computing device, such as a smartphone, tablet computer, smartwatch, etc., as well other forms of computer systems, such as a desktop computer system, laptop computer system, server computer systems, etc. The commerce platform system 110, merchant system 120, and payments partner system 140 may also be one or more computing devices, such as one or more server computer systems, desktop computer systems, etc.

The commerce platform system 110, merchant system 120, customer device 130, and payment partner system 140 may be coupled to a network 102 and communicate with one another using any of the standard protocols for the exchange of information, including secure communication protocols. In one embodiment, one or more of the commerce platform system 110, merchant system 120, customer device 130, and payment partner system 140 may run on one Local Area Network (LAN) and may be incorporated into the same physical or logical system, or different physical or logical systems. Alternatively, the commerce platform system 110, merchant system 120, customer device 130, and payment partner system 140 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform 110 provides financial processing services to a plurality of merchant systems 120. In embodiments, the financial processing services provided by commerce platform system 110 to merchant system 120 include, but are not limited to, managing account(s) of the merchant system 120, running financial transactions (e.g., when customer device 130 interacting with merchant system 120 seeks to perform a transaction for a good or service provided by the merchant system 120), clearing transactions, performing payouts to agents of the merchant (e.g., users (not shown) performing transactions on behalf of the merchant system 120), managing merchant and/or agent accounts, performing tax reporting services, etc., as well as other services typically associated with commerce platforms systems such as, for example, STRIPE™. However, before providing such services, the merchant system 120 participates in an onboarding process in which a user of the merchant system 120 interacts with the commerce platform 110 to provide account data. Such account data includes, for example, an account type, an account owner, an account name, authorized users, banking information, credit processing information, preferences, credentials (e.g., usernames, passwords, encryption key establishment and distribution, etc.), etc. The account information exchanged between the merchant system 120 and the commerce platform system 110 establishes a merchant account at the commerce platform system 110 with sufficient information to enable commerce platform system 110 to safely and securely run various kinds of financial transactions on behalf of the merchant system 120.

In embodiments, merchant system 120 interacts with commerce platform system 110 to perform financial and/or other aspects of transactions, such as when a customer system 130 seeks to purchase a good or service from the merchant system 120. In embodiments, the interactions can include software systems executed by the merchant system 120 integrated with and using one or more application programming interface(s) (APIs) of the commerce platform to exchange a series of messages and perform a series of operations to complete the transaction. In embodiments, the commerce platform system 110 may deploy one or more API endpoints to receive API messaging from the merchant system, such as GET, POST, PUT, etc. API calls to, for example, pass merchant identifiers to the commerce platform system 110, exchange credentials that authenticate the merchant system 120 to the commerce platform system 110, encrypt and transfer messages encrypted with one or more encryption keys (for which the receiving party has a private or other key for decryption an encrypted payload portion of a message, initiate transactions of various types, set transaction parameters, etc. In other words, the API based messaging, content of message payloads, sequence of messaging, etc. exposes the financial processing services of the commerce platform system 110 to the merchant system 120, which once integrated into the software systems of the merchant system 120, enables the merchant system's 120 usage of the various services provided by the commerce platform system 110.

In embodiments, payments partner system 140 is another system that provides one or more financial processing services. For example, payment partner system 140 may be a mobile payments system, an electronic wallet system for which a user of the customer device 130 has an account and maintains financial information, a payments system that utilizes a credit and loan model for purchases (e.g., the payments partner system supplies payment for a transaction and the customer remunerates the payments partner system over a series of payments), authorization networks, banking systems, credit card brand systems, as well as other types of systems that are capable of providing payment services. However, each payments partner system, such as payment partner system 140, also exposes the functions of their respective system in different ways, such as using different API based integrations, different messaging formats, different message timing, different protocols, etc. As such, each payments partner system that the merchant system 120 may seek to use will require a separate integration, which is time consuming, requires non-trivial engineering, testing, and debugging efforts, and complicates existing software and hardware systems of the merchant system 120.

In embodiments, commerce platform system 110 addresses the problems that arise when a merchant system 120 seeks to transact with their customers (e.g., customer device 130) using any and/or all of the payments partner systems. In particular, commerce platform system 110 provides a real-time, low latency, and minimal effort solution that enables merchant system 120 to interact with any of the payment partner systems, such as payments partner system 140, where merchant system 120 may or may not already have an existing relationship (e.g., an account with account identifiers and other information) with the payments partner system 140. Furthermore, no additional integration efforts are placed on the merchant for interacting with payments partner systems. In embodiments, commerce platform system 110 establishes integrations with the plurality of payments partner systems to enable the transactions provided by each payments partner systems, including establishing commerce platform system 110 credentials and authorization information at the payments partner system 140, integrating each payments partner system's API based messaging and protocols for handling the transactions and transaction types provided by the respective payments partner systems 140, and pooling a set of commerce platform system payments partner identifiers (CP System PP IDs) associated with accounts/credentials that enable the commerce platform system 110 to interact with the associated payments partner system to perform a transaction.

After the commerce platforms system 110 establishes itself at each of the payments partner systems, commerce platform system 110 then provides frictionless, low latency, and real-time onboarding of the merchant system 120 to any of the payments partner systems, such as payments partner system 140. In embodiments, a listing, enumeration, or other indication of the available payments partner system is provided form commerce platform system 110 to merchant system 120. Then, commerce platform system 110 leverages their existing relationship with merchant system 110 to enable merchant system 120 to authenticate themselves to the commerce platform 110 when requesting a transaction (e.g., based on an interaction between customer device 130 and merchant system 120). However, the transaction originated at merchant system 120 and communicated to commerce platform system 110 may specify that the transaction is to use one of the enumerated payments partner systems, for example payments partner system 140, to process the financial aspects of the transaction. For example, merchant system 120 may present various payment options to customer device 130 (e.g., systems that provide credit for periodic payments, access to financial information within electronic wallet systems, etc.), and enable the customer device 130 to select the desired payment option. Furthermore, merchant device 120 may not have any relationship with the selected payments partner system prior to the customer selection.

Upon receiving the transaction from the merchant system specifying payments partner system 140, commerce platform system 110 initially determines whether the merchant system 120 has an established relationship with payments partner system 140. In embodiments, such established relationships (e.g. user names, account identifiers, and other credentials of the merchant system 120 for the selected payments partner system) are stored in a merchant account maintained by the commerce platform system 110, such that if established commerce platform system 110 may interact with the payments partner system 140 as a proxy between the merchant system 120 and the payments partner system 140. More specifically, the merchant system 120 interacts with the commerce platform system 110 using commerce platform APIs, protocols, messaging, and merchant authentication credentials that enable merchant system 120 to authenticate itself and its messages to the commerce platform system 110. In turn, the commerce platform system 110 then utilizes its API based integrations with the selected payments partner system, uses its authentication credentials that enable commerce platform system 110 to authenticate itself and its messages to the selected payments partner system, and with the established relationship, is able to supply relevant merchant account identifiers and other account information to the selected payments partner system. By acting as a proxy, commerce platform system 110 provides a one-to-many approach where the merchant system 120, which may not be an expert in software integra-
tions, transaction processing protocols, API messaging, etc.,
need only integrate with the commerce platform system 110.
Then, commerce platform 110, which has existing
integrations with various payments partner systems, and has
established relationships with such systems, leverages those
integrations and relationships to remove the effort and
integration tasks that would otherwise be required of the
merchant system 120. Instead, merchant system 120 speci-
fies the payments partner system to use in a transaction, and
the commerce platform system 110 handles the specifics of
the transaction interactions including messaging formatting,
protocol handling, authentication, etc.

In embodiments, upon receiving the transaction from the
merchant system specifying the payments partner system
140, commerce platform system 110 may determine that the
merchant system 120 does not have established relationship
with payments partner system 140. Such a request is treated
as the merchant system 120 expressing an intent to be
onboarded for use of the selected payments partner system
140. In embodiments, to provide low latency onboarding of
the merchant system 120 for use of the payments partner
system 140 to process the current transaction, commerce
platform system 110 selects one of the CP System PP IDs
from the pool, and associates the selected CP System PP IDs
with the merchant system's 120 account at the commerce
platform system 110. Since the selected CP System PP ID is
an active and valid provisioned ID, which the commerce
platform system 110 has established to perform transactions
using the payments partner system 140, the transaction may
occur without delay or onboarding time by the commerce
platform system 110 using its integration and authentication
credentials with the payments platform system 140 to com-
plete the transaction. Furthermore, since the selected CP
System PP ID is associated with the merchant system's 120
account at the commerce platform system 110, commerce
platform system 110 can appropriately track and account for
the transaction. Beneficially, no integration burdens are
placed on the merchant system 120, even though the mer-
chant system 120 is enabled to transact with customer device
130 using the selected payments platform system 140.

In embodiments, it is the initial transaction in which the
merchant system 120 selects a payments platform system
140, where no pre-existing relationship exists, where com-
merce platform system 110 selects a CP System PP ID and
associates that CP System PP ID with the merchant account
at the commerce platform system 110 thereby establishing a
new relationship between the merchant system 120 and the
payments partner system 140. As discussed above, the
originating transaction is processed to completion by the
commerce platform system 110 acting as a proxy, without
delay so that the new relationship formed in the merchant
account information at the commerce platform 110 amounts
to a real time onboarding of the merchant system 120 to the
payments partner system 140. In embodiments, the low
latency real-time onboarding both improves the user of
customer device's 130 experience with the merchant system
120 and improves transaction completion rates at the mer-
chant system 120 for new payments partner systems. In
embodiments, the transaction proceeds without delay
because of the commerce platform system's 110 selection
and use of the CP System PP ID selected from the pool of
CP System PP IDs, and associating that selection with a
merchant system account maintained at the commerce plat-
form system.

In embodiments, commerce platform system 110 may
then use a subset of merchant account information maintained at the commerce platform 110 to establish a merchant
account at the payment partner system, such as establishing
merchant system 120 specific authentication credentials,
payments partner account identifiers for the merchant sys-
tem's 120 account, account preferences, etc. In embodi-
ments, the commerce platform system 110 performs the
merchant account establishment process with the payments
partner system 140 asynchronously with the transaction to
prevent merchant account finalization at the payments part-
ner system 140 from causing any delay in completion of the
transaction. Furthermore, should payments partner system
140 require certain additional information from a merchant
system 120 which is not already within the merchant
account at the commerce platform system 110, the com-
merce platform system 110 may obtain the additional infor-
mation (e.g. though API based requests, email communica-
tion, or other messaging) after the transaction processing.
Furthermore, commerce platform system 110 is typically
able to supply any needed information for account estab-
lishment at a payments partner system 140 on behalf of a
merchant system 120 from the merchant system's commerce
platform system account. Thus, the asynchronous account
setup performed for the merchant also minimizes effort on
behalf of the merchant system 120. In embodiments, once
established, commerce platform system 110 communicates
the payments partner system 140 account details to the
merchant system 120. Thus, commerce platform system 110
provides real time account onboarding for low latency and
no additional effort for use of a payments partner system by
the merchant system 120, and asynchronous creation of a
merchant system account at the payments partner system
again to minimize effort placed on the merchant system 120.

In embodiments, the selected CP System PP ID associated
with the merchant system account for the payments partner
system 140 may be converted to a permanent identifier.
However, in other embodiments, the selected CP System PP
ID is temporary, and the account establishment discussed
above results in a permanent PP ID generated for merchant
system 120 by payments platform system 140, which com-
merce platforms system updates in the merchant system's
120 account at commerce platform system 110. Further-
more, in some embodiments, commerce platform system
110 performs monitoring of the CP System PP IDs for each
pool for each payment partner system so that commerce
platform system 110 can periodically establish new CP
System PP IDs when, for example, a total number of CP
System PP IDs in a pool drops below a threshold amount. In
some embodiments, for example for some payments partner
systems, CP System PP IDs can also be replenished on a
per-usage basis. In either embodiment, this ensures that
sufficient CP System PP IDs will remain available in the
respective pools for each payments partner system 140 to
enable the low latency real time onboarding of merchants, as
discussed herein.

Figure 2:
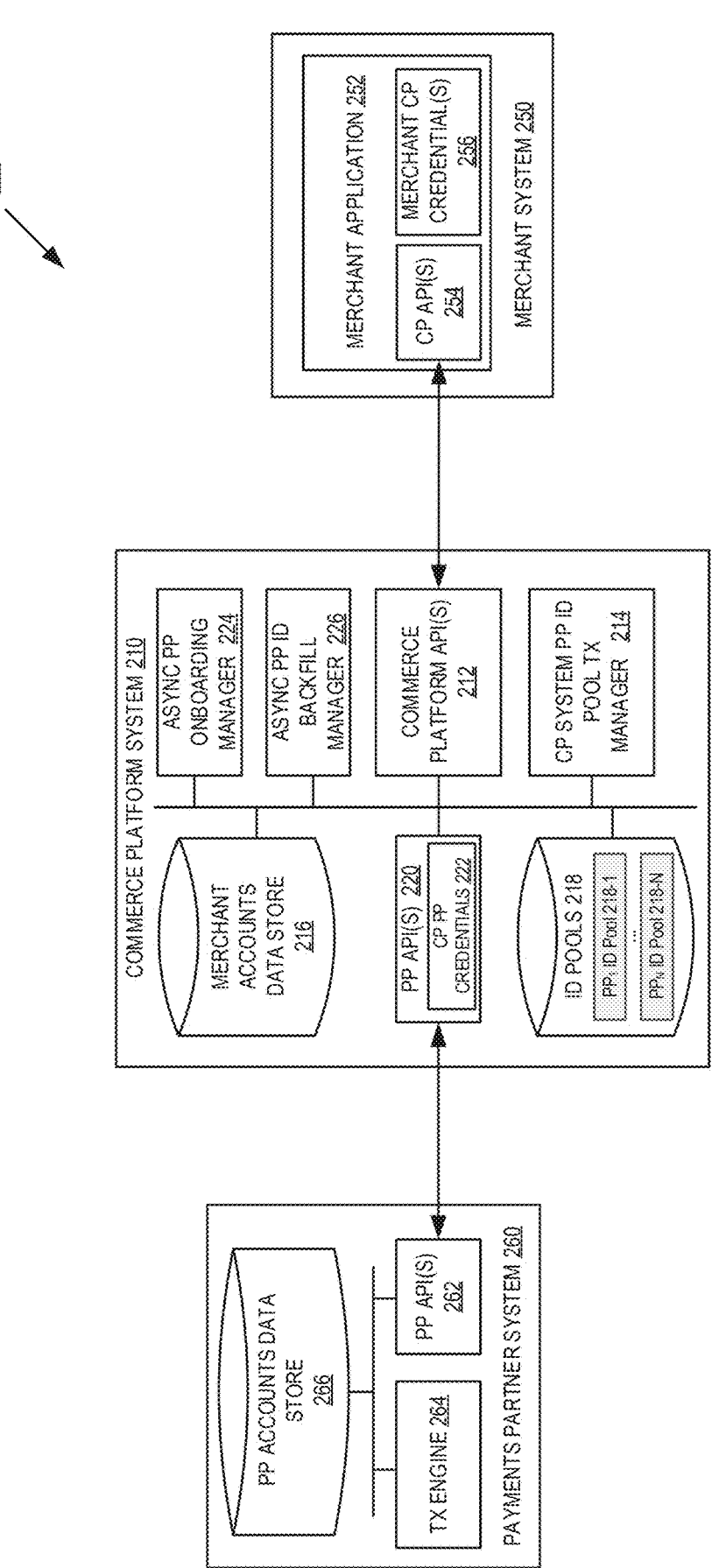
FIG. 2 is a block diagram of one embodiment of a platform system providing real time onboarding to an entity system with a partner system.

FIG. 2 is a block diagram of one embodiment 200 of a
platform system providing real time onboarding of an entity
system to a partner system. In one embodiment, commerce
platform 210 includes commerce platform API(s) 212 which
are a set of API endpoints configured to receive and process
API based messages from CP API(s) 254 integrated within
merchant application 252 executed by a merchant system
250. Merchant application 252 may be, for example, a web
page based application providing a commerce user interface
to a customer of the merchant system 250, it may be a
mobile application executed by an agent of the merchant, a
standalone application, etc. In any embodiment, the mer-
chant application 252 is integrated with the CP API(s) 254 which are configured to exchange messages with the commerce platform API(s) 212 executed at the commerce platform 210. Furthermore, the API based messages exchanged between CP API(s) 254 and commerce platform API(s) 212 can include the usage of merchant commerce platform (CP) credentials 256, such as merchant account identifiers for merchant accounts established at commerce platform 210, usernames and/or passwords, access and/or encryption keys, etc.

Commerce platform API(s) 212 uses received merchant CP credential(s) 256 in the API based messaging to verify a merchant's identity and account established at the commerce platform system 210. In embodiments, the merchant's account information, such as usernames, beneficial owners, entity type, place of incorporation, place of business, etc., as well as authentication credentials are maintained by the commerce platform system 210 in merchant accounts data store 216.

In one embodiment, a CP API(s) 254 based message may be for a transaction to be processed by the commerce platform system 210 and which specifies the usage of payments partner system 260 to perform at least a part of the transaction. In response to such a request specifying payments partner system 260, CP System Payments Partner (PP) ID Pool Transaction (TX) manager 214 determines if the merchant system 250 has an existing relationship with the selected payments partner system (e.g. payments partner system 260). In embodiments, the CP System PP ID Pool TX manger 214 determines whether the merchant's account identified by a received merchant ID exchanged to initiate and process the transaction is associated with the PP ID in the merchant accounts data store 216.

When the association exists, the merchant system 250 is determined by the CP System PP ID Pool TX manger 214 to have been previously onboarded with the payments partner system 260. CP System PP ID Pool TX manager 214 then informs commerce platform API(s) 212 to perform the transaction using the PP ID from the merchant's account. The transaction is forwarded to PP API(s) 220, which are a set of API based processes utilizing API(s) of the payments partner system 260 integrated into the commerce platform system 210, such that a transaction request received from merchant system 250 through the commerce platform system's 210 API(s) are translated into corresponding requests using the formats, structure, sequence, etc. of the payments partner system's 260 APIs before sending to the payments partner system 260. Similarly, payments partner system 260 API based messages are received at PP API(s) 220, which performs translation of the received messages to commerce platform system 210 API based messages before forwarding to merchant system 250 via API(s) 212. PP API(s) 220 thus exchange one or more messages using the format, protocol, etc. of the payments platform system's PP API(s) 262 using the merchant's account information for the payments partner system, as accessed from the merchant account data store 216. Furthermore, commerce platform system uses the CP PP credentials 222 when exchanging these messages, which are access credentials established by the commerce platform system 210 with the payments partner system 260, and maintained by the payments partner system 260 in PP accounts data store 266. The API based messaging exchanged between the commerce platform systems PP API(s) 220 and the payments partner system PP API(s) 262 are forwarded to the transaction engine 264 of the payments partner system 260 for processing of the transaction (e.g., checking merchant account identifiers, clearing a transaction, etc.). The processing of the transaction, in embodiments, may involve several stages, in which case the commerce platform system 210 continues to act as a proxy between the merchant system 250 (e.g., exchanging commerce platform API based messaging between CP API(s) 254 and commerce platform API(s) 212 using merchant authentication credentials) and the payments partner system 260 (e.g., exchanging payments partner based API messaging between PP API(s) 220 and the PP API(s) 262 using the commerce platform's PP credentials 222.

When the association does not exist, the merchant system 250 is determined by the CP System PP ID Pool TX manger 214 to not have been previously onboarded with the payments partner system 260. Thus, CP System PP ID Pool TX manger 214 performs low latency real-time onboarding by selecting a CP System PP ID from one of the appropriate PP ID Pools (e.g., from one of pools $PP_1$ ID Pool 218-1 through PPN ID Pool 218-N, where the $i^{th}$ pool is associated with an $i^{th}$ payments partner system). As discussed herein, the CP System PP IDs maintained in the pools (e.g. pools 218-1 through 218-2) in IP pools data store 218 are established by the commerce platform system 210 with each individual payments partner system. For example, commerce platform system 210 may establish 100, 1,000, 10,000, etc. CP System PP IDs for each payments partner system to ensure that a CP System PP ID is available for real-time onboarding of merchant systems, given a historic or anticipated onboarding volume associated with each payments partner system. Thus in embodiments, the size of the pools may be the same for each payments partner system, or different for one or more payments partner system(s) in view of the historic or anticipated needs associated with specific payments partner system(s).

Once selected, the CP System PP ID from the associated pool may be associated with the merchant system's 250 account in the merchant accounts data store 216, and used when exchanging transaction messages with the payments partner system via the API(s) 220 and 262. Furthermore, the commerce platform system 210 continues to authenticate itself to the payments partner system 260 using the CP PP credentials 222. Then, as discussed above, the commerce platform system 210 acts as a proxy between the merchant system 250 and the payments platform system 260 until the initially requested transaction is completed. Thus, even when the merchant system 250 does not have an existing relationship or account at the payments partner system 260, merchant system 250 is enabled by the commerce platform to perform the request transaction with low latency ensuring a good user experience. Furthermore, the specification of the new payments partner system in the transaction is handled by the commerce platform system 210 as an inferred request to onboard (e.g. establish an account and relationship) the merchant system 250 to the payments partner system 260, which is performed in real-time via the selection and use of previously provisioned CP System PP IDs.

Then, in embodiments, asynchronous payments platform onboarding manager 224 is notified by the CP system PP ID pool TX manager 214 that the merchant system 250 is to be onboarded to the payments partner system 260. Asynchronous payments platform onboarding manager 224, after the transaction is completed (e.g., periodically, such as daily, weekly, etc.) performs asynchronous onboarding of the merchant system 250 to the payments partner system 260. In embodiments, asynchronous payments platform onboarding manager 224 determines, based on onboarding data collection requirements associated with payments partner system 260, whether there is sufficient merchant account information within merchant accounts data store 216. When there is, the asynchronous payments platform onboarding manager 224 may complete the merchant system 250 onboarding to the payments partner system 260 without further messaging exchange to the merchant system 250. However, in some embodiments, there may be instances when additional information is needed to satisfy onboarding data collection requirements, in which case asynchronous payments platform onboarding manager 224 obtains the additional information from the merchant system 250. Asynchronous payments platform onboarding manager 224 then completes the onboarding, including updating the merchant system's account in the merchant account data store 216 to include the payments partner account information of the merchant (e.g. associating a merchant ID with a payments partner ID for later transactions). In embodiments, the merchant system's 250 PP ID may be the same ID selected during the real-time onboarding, or may be a newly provisioned ID.

Furthermore, asynchronous payments platform ID backfill manager 226 performs asynchronous monitoring of the status of each of the PP ID pools (e.g., pools 218-1 through 218-N). The management may include ensuring each pool has a sufficient number of CP System PP IDs, which may be determined based on a predefined number (e.g. 10, 100, 1000, etc.), based on historic or predicted usage for a given payments partner system (e.g., $PP_j$ ID Pool maintains a total of 1000 CP System PP IDs since payments partner system$_j$ is frequently selected, while $PP_k$ ID Pool maintains a total of 50 CP System PP IDs since payments partner system is used infrequently). Furthermore, the frequency at which the CP System PP IDs are replenished, for example by asynchronous payments platform ID backfill manager 226 causing PP API(s) 220 to obtain new CP System PP IDs, is dependent on the processes of the respective payments partner system associated with a given pool. For example, CP System PP ID replenishment may be on a per usage basis when API based replenishment is possible. As another example, where CP System PP ID replenishment is performed manually, asynchronous payments platform ID backfill manager 226 may request batches or sets of CP System PP IDs when a total number of CP System PP IDs in a pool satisfies a replenishment threshold level (e.g. drops below 50%, 10% remaining, etc.).

FIG. 3 is a flow diagram of one embodiment of a method for a platform system real time account onboarding of an entity system to a partner system. The method 300 is performed by processing logic that may comprise hardware (circuitry, dedicated logic, etc.), software (such as is run on a general purpose computer system or a dedicated machine), firmware, or a combination. In one embodiment, the method 300 is performed by a commerce platform system (e.g. commerce platform system 110 or 210).

Referring to FIG. 3, processing logic begins by receiving, at a commerce platform (CP) system from a merchant system, a transaction request using a merchant identifier (ID) and merchant system authentication credentials associated with the merchant ID to authenticate the merchant system to the CP system, the transaction request specifying a payments partner (PP) system for completion of the transaction and using a first set of CP API(s) (processing block 302). In embodiments, discussed herein, the merchant system and the commerce platform system interact with one another using a set of commerce platform system API(s) and merchant authentication credentials. In other words, a merchant system with a commerce platform system account uses a merchant application to communicate with processing logic via one or more API based messages using the CP API(s), and using the established merchant system authentication credentials to authenticate the exchanged messages.

Processing logic determines whether the merchant system is onboarded for use of the payments platform system (processing block 304). In embodiments, processing logic determines whether a merchant account (e.g. based on a received merchant ID) is associated with a payments partner system ID by the commerce platform system. As discussed herein, for onboarded merchant systems, a merchant accounts data store will store the merchant system's respective payments platform identifiers, which indicates a prior onboarding. In response to this, processing logic selects the payments partner system ID associated by the commerce platform system with the merchant identifier for the received transaction (processing block 306), and proceeds to processing block 312 as discussed below.

However, when no payments platform system ID is associated with a merchant ID in a merchants account data store at the commerce platform system (processing block 304), processing logic infers the merchant has requested to be onboarded for use of the payments partner system, and proceeds to processing block 308. Processing logic selects a commerce platform system payments partner identifier from a pool of available commerce platform system payment partner identifiers provisioned by the payments partner system for the commerce platform system (processing block 308). As discussed above, commerce platform system has an established account and relationship with the payments partner system, and therefore obtains a set of payments partner system account IDs, which are pooled together and used when, for example, a transaction of a merchant system is received and associated with an inferred request to be onboarded to the payments partner system. Processing logic then updates a merchant accounts data store associating the selected commerce platform system payments partner identifier with the merchant identifier (processing block 310). In embodiments, this association of the merchant system's identifier with the preprovisioned commerce platform system payments partner identifier acts as a real-time onboarding of the merchant system to the payments partner system. That is, processing logic may then proceed to process the transaction using the requested payments partner system with low latency.

Processing logic proceeds to process, by the commerce platform system, the received merchant system transaction using the selected payments partner identifier associated by the commerce platform system with the merchant ID, the commerce platform system using a second set of payments partner API(s) and commerce platform payments partner credentials established by the commerce platform with the payments partner system to authenticate the commerce platform system to the payments partner system for performing the transaction (processing block 312). Furthermore, processing logic continues to act as a proxy translating between commerce platform API based messaging exchanged between the commerce platform and the merchant system (using merchant system credentials to the commerce platform) and payments partner system API based messaging exchanged between the commerce platform system and the payments partner system (using commerce platform system credentials to the payments partner system). Thus, the commerce platform system proxying message exchanges between the merchant system and the payments partner system enables the merchant system access to any number of payment partner system without friction or engineering effort associated with integrating with each individual payments partner system.

Figure 4:
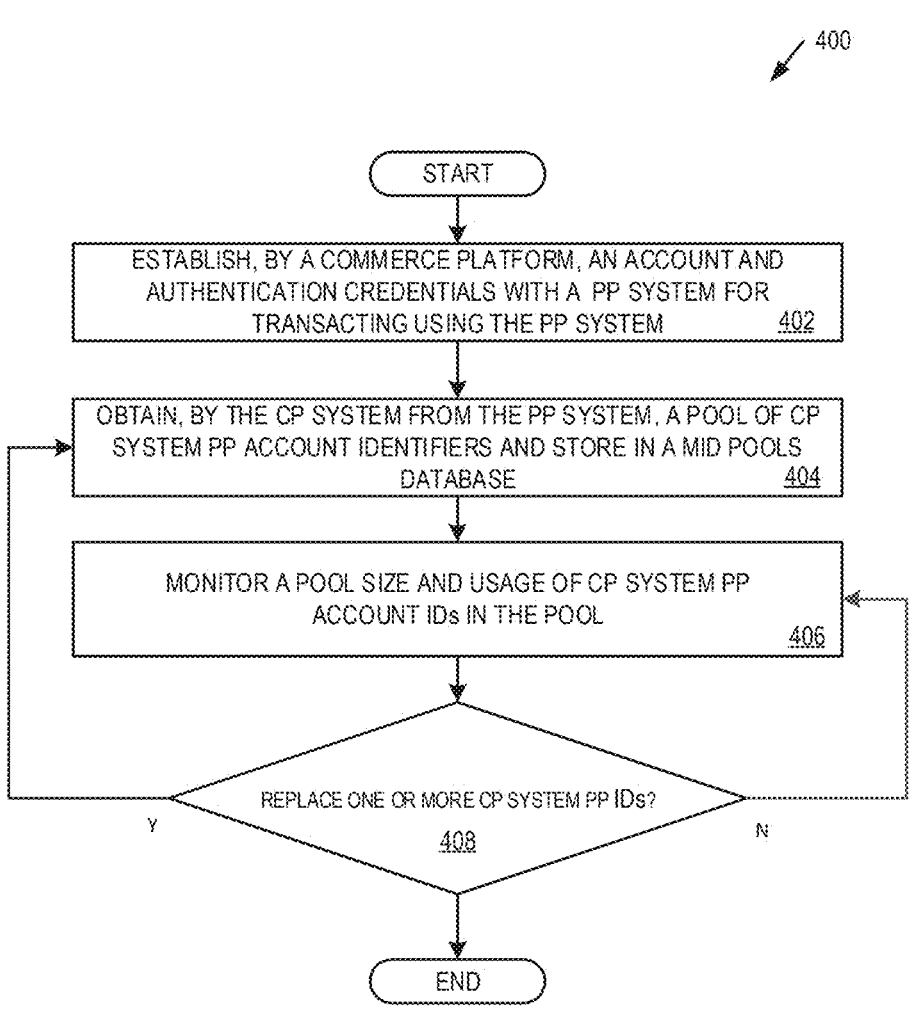
FIG. 4 is a flow diagram of one embodiment of a method for a platform system performing asynchronous identifier management.

FIG. 4 is a flow diagram of one embodiment of a method 400 for a commerce platform system performing asynchronous commerce platform system payment partner account identifier management. The method 400 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., commerce platform system 110 or 210).

Referring to FIG. 4, processing logic begins by establishing, by a commerce platform system, an account and authentication credentials with a payments partner system for transacting using the payments partner system (processing block 402). In embodiments, the commerce platform system establishes its own accounts with various payments platform systems which the merchant system users may desire to use. Furthermore, with the establishment of the accounts commerce platform system further integrates with respective API(s) of each payments partner system so that commerce platform can exchange API based messages with the payments partner systems, such as by converting between messages received at the commerce platform form merchant system (e.g., using commerce platform system APIs) to payment partner system API base message enabling the commerce platform to act as a proxy between the merchant system and various payment platform system, as discussed herein.

Processing logic obtains, by the commerce platform system from the payments partner system, a pool of commerce platform system payments partner identifiers, and stores those identifiers in a corresponding payments partner identifier pool in an identifier pools data store (processing block 404). Processing logic then monitors a pool size and usage of commerce platform system payments partner identifiers in the pool (processing block 406). In embodiments, the monitoring may be performed periodically or in response to a commerce platform system payments partner ID assignment to a merchant system. In either embodiment, the monitoring is performed asynchronously to transaction processing, as discussed above.

Processing logic then determines whether to replace one or more commerce platform system payments partner identifiers (processing block 406). As discussed herein, the commerce platform system payments partner identifiers are identifiers of commerce platform system accounts established with a payments partner system. Furthermore, the commerce platform system payments partner identifiers are available for assignment to merchant system that seek to be onboarded to a particular payments partner system to which the commerce platform system payments partner identifiers pertain. Thus, when a total number of the available or used commerce platform system payments partner identifiers satisfies a replacement threshold (e.g. drops 10%, drops 50%, 10% remaining, etc.), or on a per-assignment basis (e.g., replacement upon each assignment to a new merchant system), processing block, processing logic returns to processing block 404 to obtain new commerce platform system payments partner identifiers. In embodiments, the commerce platform system payments partner identifiers are obtained so that no commerce platform system payments partner identifier is later re-used. When the condition is not satisfied, processing logic returns to processing block 406 to continue to monitor the pool size and usage of the commerce platform system payments partner identifiers.

Figure 5:
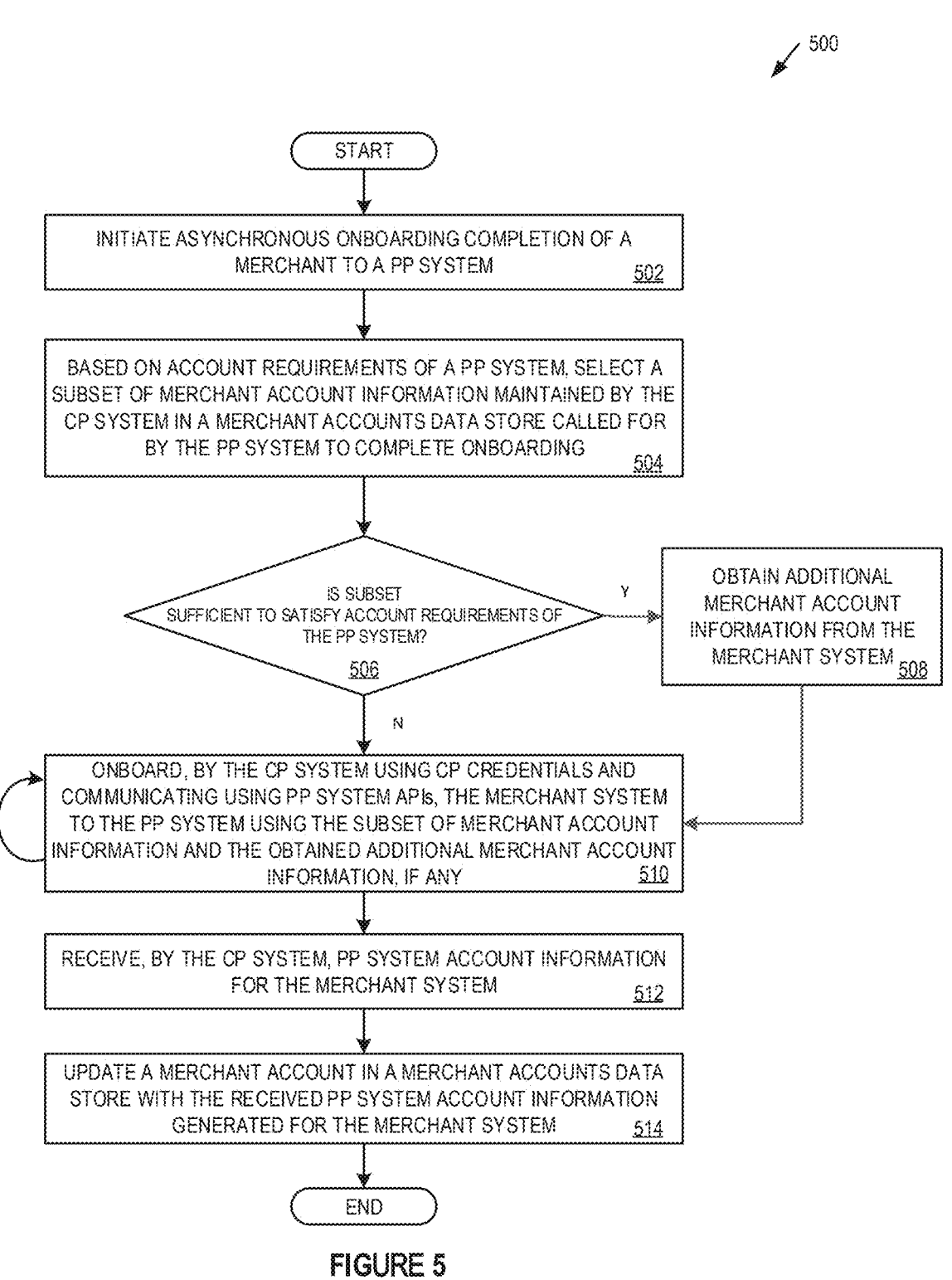
FIG. 5 is a flow diagram of one embodiment of a method for a platform system performing asynchronous onboarding completion of an entity system to a partner system.

FIG. 5 is a flow diagram of one embodiment of a method for a commerce platform system performing asynchronous onboarding completion of a merchant system to a payments partner system. The method 500 is performed by processing logic that may comprise hardware (circuitry, dedicated logic, etc.), software (such as is run on a general purpose computer system or a dedicated machine), firmware, or a combination. In one embodiment, the method 400 is performed by a commerce platform system (e.g., commerce platform system 110 or 210).

Referring to FIG. 5, processing logic begins by initiating asynchronous onboarding completion of a merchant system to a payments partner system (processing block 502). As discussed herein, merchant systems may select, in a transaction forwarded to a commerce platform, one of a plurality of different payments partner systems to complete a transaction with a customer device. When the merchant system does not have an existing relationship with the selected payments platform system, commerce platform assigns the merchant system with a commerce platform system payments partner identifier to both enable the merchant system to complete the transaction with low latency, and also onboard the merchant in real-time during the transaction for use of the payments partner system. Then, asynchronous to the transaction, processing logic may complete the onboarding of the merchant system, such as establishing a new payments partner identifier for the merchant system or converting the commerce platform system payments partner identifier to a permanent partner identifier for the merchant system, associating the new payments partner identifier with the merchant account at the commerce platform, and satisfying any additional data collection requirements imposed by the payments partner system.

Processing logic, based on account requirements of a payments partner system, selects a subset of merchant account information maintained by the commerce platform system in a merchant accounts data store called for by the payments platform system to complete the onboarding (processing block 504). That is, processing logic selects only the relevant merchant account information needed to satisfy payments partner onboarding requirements, to minimize data sharing and/or exposure of non-relevant merchant account information.

Furthermore, processing logic determines if the subset is sufficient to satisfy the account requirements of the payments partner system (processing block 506). In embodiments, commerce platform seeks to minimize the efforts on the merchant system, and thus will attempt to complete the merchant system onboarding to the payments partner system without further interaction with the merchant system, since the request to use the payments partner (e.g. FIG. 3) acted as an inferential onboarding request. When additional merchant information is needed (e.g., additional merchant account details not already known to the commerce platform system), processing logic obtains the additional merchant account information from the merchant system (processing block 508), and then proceeds to processing block 510. For example, commerce platform may send a request and link to a user interface in which the additional information can be collected, send a fillable form or a link to a fillable form that can be electronically transmitted to the commerce platform upon completion, etc. to collect additional biographical information, account preferences, financial accounting information, etc.

However, when sufficient merchant system account information is known to the commerce platform system (e.g. stored in merchant account data store, as obtained from the merchant when the merchant system was previously onboarded to the commerce platform system), processing logic proceeds to processing block 510 to onboard, by the commerce platform system using commerce platform system credentials and communicating using payments partner system API(s), the merchant system to the payments partner system using the subset of merchant account information and the obtained additional merchant account information, if any (processing block 510). In embodiments, the onboarding can include the exchange of several messages.

Processing logic then receives, by the commerce platform system, payments partner system account information for the merchant system (processing block 512). For example, new payments partner system account identifiers may be generated for the merchant system, additional account credentials, etc. Processing logic therefore updates the merchant account information in the merchant accounts data store with the received payments partner system account information generated for the merchant system (processing block 514). In embodiments, this can include, for example, associating a payments partner account identifier generated for the merchant system with merchant's commerce platform system merchant ID in the merchant data store, associating new/update credential information in the merchant accounts data store, populating any additional new information associated with the merchant collected during onboarding (e.g. processing block 508) in a merchant account maintained in a merchant accounts at store, etc. In embodiments, a notification may then be generated informing the merchant system of the successful onboarding to the payments partner system.

In embodiments, the subsequent onboarding, performed with the merchant system/payments partner system transaction, is completed in a process asynchronously with the transaction. As a result, there is no latency or delay in the transaction processing. Furthermore, for most merchant system onboardings to new payments partner systems, commerce platform system will have sufficient merchant account information (e.g. in merchant account data store) to complete the onboardings, without further contact. Thus, the usage and onboarding to new payments partner systems, as discussed herein, requires minimal efforts from the merchant system and payments partner systems, thus enabling more efficient forming of relationships between such systems.

Figure 6:
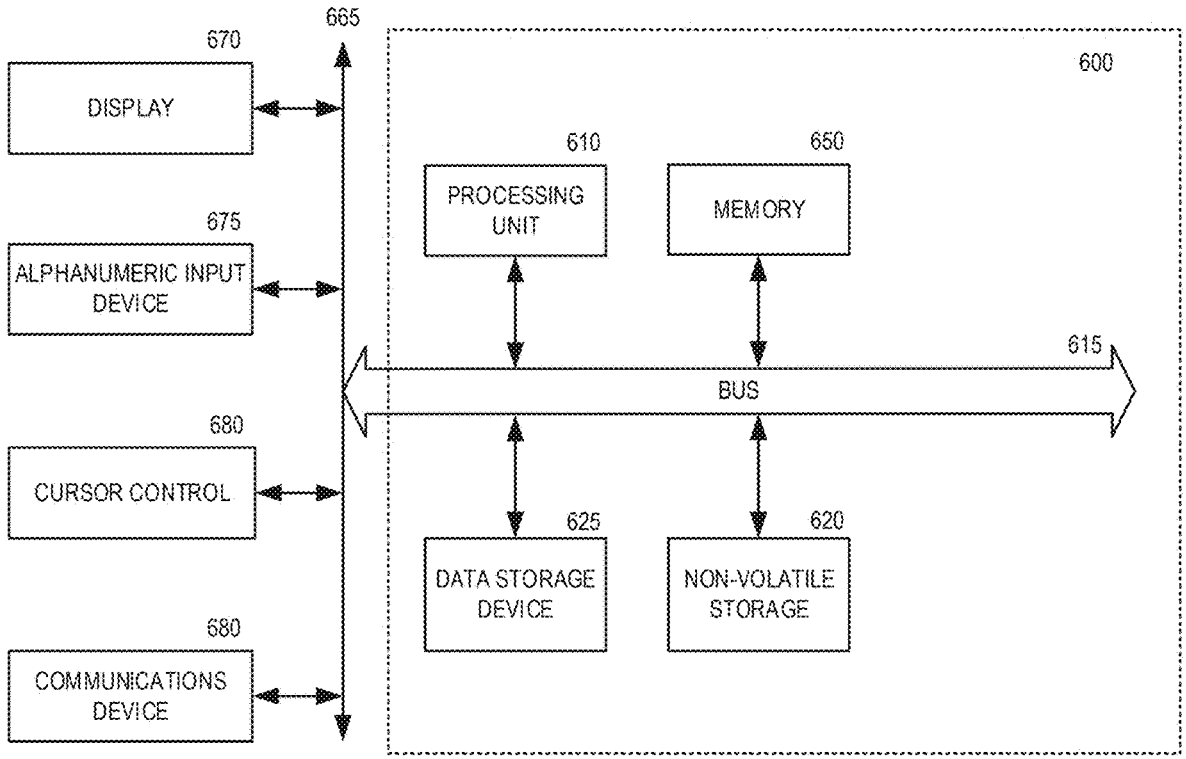
FIG. 6 is one embodiment of a computer system that may be used to support the systems and operations discussed herein.

FIG. 6 is one embodiment of a computer system that may be used to support the systems and operations discussed herein. For example, the computer system illustrated in FIG. 6 may be used by a commerce platform system, merchant systems, payments partner systems, etc. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

Figure 7:
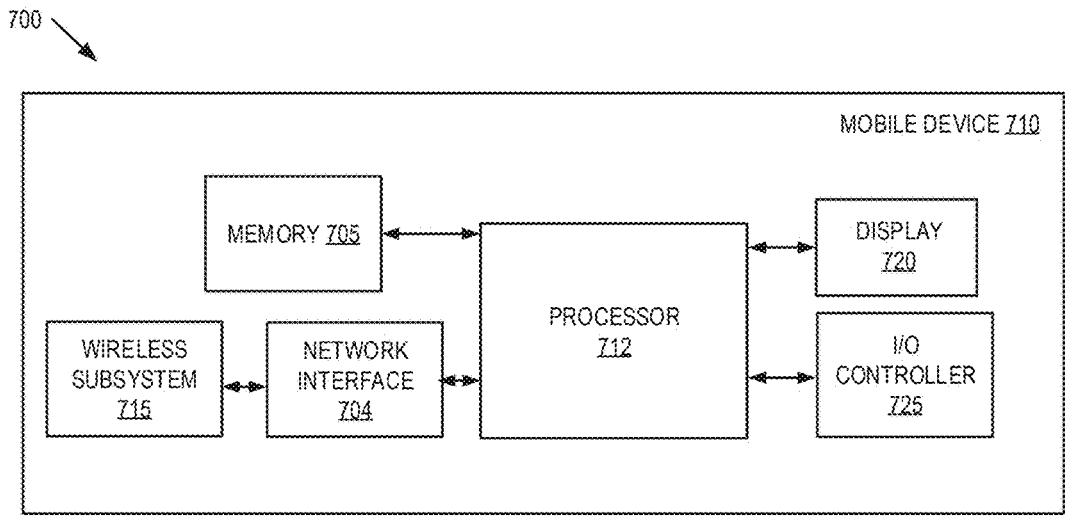
FIG. 7 is one embodiment of a mobile device that may be used to support the systems and operations discussed herein.

FIG. 7 is block diagram of one embodiment 700 of a mobile device. Mobile device 710 may be used, for example, as a customer device when interacting with the merchant system to initiate transactions in which a specific payments partner system is selected by the user of the customer device.

In one embodiment, mobile device 710 is a system, which may include one or more processors 712, a memory 705, I/O controller 725, network interface 704, and display 720. Mobile device 710 may also include a number of processing modules, which may be implemented as hardware, software, firmware, or a combination. It should be appreciated that mobile device 710 may also include, although not illustrated, a user interface (e.g., keyboard, touch-screen, or similar devices), a power device (e.g., a battery), as well as other components typically associated with electronic devices. Network interface 704 may also be coupled to a number of wireless subsystems 715 (e.g., Bluetooth, Wi-Fi, Cellular, or other networks) to transmit and receive data streams through a wireless link to/from a network, or may be a wired interface for direct connection to networks (e.g., the Internet, Ethernet, or other wireless systems). In one embodiment, both network interface 704 and wireless subsystem 715 couple mobile device 710 to a network.

Memory 705 may be coupled to processor 712 to store instructions for execution by processor 712. In some embodiments, memory 705 is non-transitory. It should be appreciated that embodiments as described herein may be implemented through the execution of instructions, for example as stored in the memory 705 or other element, by processor 712 of mobile device 710 and/or other circuitry of mobile device 710 and/or other devices. Particularly, circuitry of mobile device 710, including but not limited to processor 712, may operate under the control of a program, routine, or the execution of instructions to execute methods or processes in accordance with the embodiments described herein. For example, such a program may be implemented in firmware or software (e.g. stored in memory 705 and/or other locations) and may be implemented by processors, such as processor 712, and/or other circuitry of mobile device 710. Further, it should be appreciated that the terms processor, microprocessor, circuitry, controller, etc., may refer to any type of logic or circuitry capable of executing logic, commands, instructions, software, firmware, functionality and the like.

Further, it should be appreciated that some or all of the functions, engines or modules described herein may be performed by mobile device 710 itself and/or some or all of the functions, engines or modules described herein may be performed by another system connected through I/O controller 725 or network interface 704 (wirelessly or wired) to mobile device 710. Thus, some and/or all of the functions may be performed by another system and the results or intermediate calculations may be transferred back to mobile device 710. In some embodiments, such other device may comprise a server, such as commerce platform 110 or 210.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

The invention claimed is:

1. A platform system for facilitating application programming interface (API) authentication for an API entity system to use an API partner system using pooled authentication identifiers without the API entity system first registering with the API partner system, the platform system comprising:

one or more processors and non-transitory media storing instructions that, when executed by the one or more processors, cause steps comprising:

storing, at the platform system, a pool of authentication identifiers comprising (i) a first third-party identifier set having authentication identifiers pre-allocated by a first third-party API partner system for use by the platform system and (ii) a second third-party identifier set having authentication identifiers pre-allocated by a second third-party API partner system for use by the platform system;

based on (i) an API request, from a first API entity system, indicating the first third-party API partner system to process at least a part of an operation and (ii) an indication that the first API entity system is not registered for use of the first third-party API partner system, linking a first third-party authentication identifier of the first third-party identifier set with the first API entity system; and without first registering the first API entity system with the first third-party API partner system, processing the operation using the first third-party authentication identifier linked by the platform system with the first API entity system, the platform system using platform authentication data established by the platform system with the first third-party API partner system to authenticate the platform system to the first third-party API partner system for performing the operation.

2. The platform system of claim 1, the steps further comprising:

after completing the processing of the operation using the first third-party authentication identifier, initiating asynchronous registration of the first API entity system to the first third-party API partner system using entity account information associated with the first API entity system.

3. The platform system of claim 1, the steps further comprising:

monitoring a size or usage level of the first third-party identifier set; and sending, based on the size or usage level falling below a replenishment threshold, a replenishment request for additional authentication identifiers to the first third-party API partner system.

4. The platform system of claim 1, wherein linking the first third-party authentication identifier of the first third-party identifier set with the first API entity system comprises retrieving, based on an inferred request parameter of the API request indicating the first third-party API partner system, the first third-party authentication identifier from the first third-party identifier set for the first API entity system.

5. The platform system of claim 1, wherein linking the first third-party authentication identifier of the first third-party identifier set with the first API entity system comprises updating an entity account in an account datastore of the platform system to store an association between the entity account and the first third-party authentication identifier.

6. The platform system of claim 1, the steps further comprising:

based on the first API entity system later submitting a subsequent API request indicating the first third-party API partner system to process at least a part of a second operation, reusing the first third-party authentication identifier previously linked to the first API entity system to process the second operation.

7. The platform system of claim 1, wherein:

receiving the API request at the platform system comprises receiving, at an application programming interface endpoint of the platform system, a platform-API-based message using platform APIs of the platform system; and processing the operation comprises sending, to the first third-party API partner system, partner-API-based messages using partner APIs of the first third-party API partner system.

8. The platform system of claim 1, wherein the platform system acts as a proxy between the first API entity system and the first third-party API partner system by authenticating the first API entity system to the platform system using entity authentication data associated with the first API entity system and authenticating the platform system to the first third-party API partner system using the platform authentication data.

9. The platform system of claim 1, wherein determining that the first API entity system is not registered for use of the first third-party API partner system comprises determining whether an identifier associated with the first API entity system in an account datastore is associated with a third-party authentication identifier for the first third-party API partner system.

10. The platform system of claim 1, wherein, before the API request from the first API entity system is received by the platform system, the first third-party authentication identifier is already activated by the first third-party API partner system as an active authentication identifier for use by the platform system.

11. A method comprising:

storing, at a platform system, a pool of authentication identifiers comprising (i) a first third-party identifier set having authentication identifiers pre-allocated by a first third-party partner system for use by the platform system and (ii) a second third-party identifier set having authentication identifiers pre-allocated by a second third-party partner system for use by the platform system;

based on (i) a request, from a first entity system, indicating the first third-party partner system to process at least a part of an operation and (ii) an indication that the first entity system is not registered for use of the first third-party partner system, linking a first third-party authentication identifier of the first third-party identifier set with the first entity system; and processing the operation using the first third-party authentication identifier linked by the platform system with the first entity system, the platform system using platform authentication data established by the platform system with the first third-party partner system to authenticate the platform system to the first third-party partner system for performing the operation.

12. The method of claim 11, further comprising:

after completing the processing of the operation using the first third-party authentication identifier, initiating asynchronous registration of the first entity system to the first third-party partner system using entity account information associated with the first entity system.

13. The method of claim 11, wherein linking the first third-party authentication identifier of the first third-party identifier set with the first entity system comprises updating an entity account in an account datastore of the platform system to store an association between the entity account and the first third-party authentication identifier.

14. The method of claim 11, further comprising:

based on the first entity system later submitting a subsequent request indicating the first third-party partner system to process at least a part of a second operation, reusing the first third-party authentication identifier previously linked to the first entity system to process the second operation.

15. The method of claim 11, wherein the platform system acts as a proxy between the first entity system and the first third-party partner system by authenticating the first entity system to the platform system using entity authentication data associated with the first entity system and authenticating the platform system to the first third-party partner system using the platform authentication data.

16. The method of claim 11, wherein determining that the first entity system is not registered for use of the first third-party partner system comprises determining whether an identifier associated with the first entity system in an account datastore is associated with a third-party authentication identifier for the first third-party partner system.

17. The method of claim 11, wherein, before the request from the first entity system is received by the platform system, the first third-party authentication identifier is already activated by the first third-party partner system as an active authentication identifier for use by the platform system.

18. One or more non-transitory computer-readable media storing instructions that, when executed by one or more processors, cause steps comprising:

storing, at a platform system, a pool of authentication identifiers comprising (i) a first identifier set having authentication identifiers pre-allocated by a first partner system for use by the platform system and (ii) a second identifier set having authentication identifiers pre-allocated by a second partner system for use by the platform system;

based on (i) a request, from a first entity system, indicating the first partner system to process at least a part of an operation and (ii) an indication that the first entity system is not registered for use of the first partner system, linking a first authentication identifier of the first identifier set with the first entity system; and processing the operation using the first authentication identifier linked by the platform system with the first entity system, the platform system using platform authentication data established by the platform system with the first partner system to authenticate the platform system to the first partner system for performing the operation.

19. The one or more non-transitory computer-readable media of claim 18, the steps further comprising:

after completing the processing of the operation using the first authentication identifier, initiating asynchronous registration of the first entity system to the first partner system using entity account information associated with the first entity system.

20. The one or more non-transitory computer-readable media of claim 18, wherein, before the request from the first entity system is received by the platform system, the first authentication identifier is already activated by the first partner system as an active authentication identifier for use by the platform system.

* * * * *